July 2, 1963 D. GABOR ET AL 3,096,398

PICTURE COMMUNICATION SYSTEMS

Filed Jan. 6, 1961 4 Sheets-Sheet 1

United States Patent Office

Patented July 2, 1963

3,096,398

PICTURE COMMUNICATION SYSTEMS

Dennis Gabor, London, and Peter Charles John Hill, Reading, England, assignors to National Research Development Corporation, London, England, a corporation of Great Britain Filed Jan. 6, 1961, Ser. No. 81,123
Claims priority, application Great Britain Jan. 6, 1960
8 Claims. (Cl. 178—6.8)

This invention relates to picture transmission systems and more particularly, but not exclusively, to television systems.

It is an accepted fact that existing television broadcast systems are very wasteful of bandwidth in as far as more information than can be accepted or appreciated by a viewer is transmitted and thereafter used to form the resultant picture at a television receiver. For example, it is usual for such a system to employ two interlaced fields to form each picture frame, whereas, in fact, the second of these fields adds very little information to the first field and is only justified to avoid flicker. A further example of such waste lies in the normal use of a high frame repetition rate (25 per second in the United Kingdom and 30 per second in the United States, for example) whereas the time revolution of the human eye does not demand such a high rate except again in the interest of avoiding flicker.

One object of the invention is to provide a picture communication system in which less picture information is transmitted than is normal and to supplement this information at a receiving or relay station with data formed by interpolation between parts of the transmitted information. Thus, effects such as flicker in television pictures may be substantially avoided and yet the impression of a normal transmission created by using a modified picture generation signal comprising the originally transmitted information and the interpolated data, whilst at the same time the transmitted information is less than is usual, and requires less bandwidth.

Another object of the invention is to transmit signals representing selected portions of a picture to be communicated and to provide means at a receiver for producing supplementary signals representing interpolated approximations of unselected portions of said picture for combination with the received signals to form composite picture signals.

Yet another object of the invention is to provide a novel method of interpolation, hereinafter referred to as contour interpolation, which provides an improved composite picture signal at the receiver which more closely approximates to the original picture signal than signals obtained by known methods of interpolation.

In the process of contour interpolation, contours, that is to say positions at which the light amplitude changes at more than a predetermined minimum rate, are sensed by the apparatus and the interpolation to produce approximations to unselected picture portions is carried out both with regard to the position of such contours in the selected picture portions actually communicated and to their amplitudes.

It will be seen that it is possible by virtue of the invention to obtain increased efficiency in the channel in two ways, namely by transmitting the selected signals in spaced manner at conventional rates whereby several such transmissions may be interlaced on a time-sharing basis or by transmitting the selected signals in continuous manner at a lower rate than is usual, thereby reducing the overall bandwidth requirements for such a transmission.

The interpolation employed by the invention may take the form of interpolation between successive pairs of lines of alternate fields to produce signals approximating to the interlaced fields. Alternatively, interpolation may be performed between corresponding lines of successive pairs of alternate frames to produce signals approximating to the intermediate frames.

The following discussion will for convenience be confined to the application of the invention to television, but may clearly be extended to applications involving picture signal transmission such as radio pictures and facsimile reproduction.

In order that the invention may be clearly understood and readily carried into effect, the same will now be more fully described by way of example with reference to the drawings, in which:

FIGURE 1 illustrates interpolation whereby an overall bandwidth reduction of 2:1 may be obtained and FIGURES 2 and 3 are explanatory of the operation of this method of interpolation.

Figure 1:
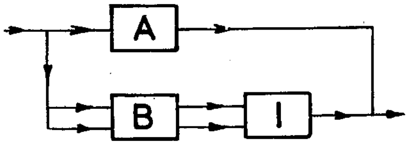
FIGURES 1, 2 and 3 illustrate interpolation in schematic form.

FIGURE 2*a* represents a conventional field sequence as employed by a television receiver in which field 2 is interlaced with field 1 to form the first frame, field 4 is interlaced with field 3 to form the second frame, and so on. In this embodiment of the invention only the odd-numbered fields are required to be transmitted and these are transmitted at half of the conventional rate as illustrated by FIGURE 2*b*, thereby giving a 2:1 bandwidth redutcion in the transmission channel compared to the normal bandwidth.

At the intermediate station the field signals are stored simultaneously on two stores A and B, the practical nature of which will be discussed hereinafter. In store B the field signals are stored in duplicate as indicated by the two input leads in FIGURE 1.

An output signal is derived from field 1 in store A when storage of field 1 is half complete. This output signal, however, is produced at the conventional rate so that the input and output at store A will terminate together for field 1, at a time two normal field periods after storage of field 1 begins.

At the time the field 1 output from store A terminates, duplicate outputs of field 1 are commenced from store B, the storage in B having been completed at that time. These duplicate output signals are also derived at the normal rate and are applied to an interpolator I which interpolates, as described hereinafter, between the duplicate signals to simultaneously generate at the normal rate a signal representing an approximation to the interlaced field 2. For this purpose the duplicate outputs from store B are in fact derived with a spacing of one line starting with line 1 and line 3, line 3 and line 5, and so on. Bearing in mind that field 1 only comprises the odd-numbered lines of the first frame, it will be seen that a one line spacing between duplicate outputs of field 1 is required.

The interpolator I then will generate signals approximating to line 2, line 4, . . . by interpolation between lines 1 and 3, lines 3 and 5 and so on, and will produce field 2 during the third field period of operation, namely in correct relation to field 1 with regard to normal standards.

Storage devices which are currently available and suitable for use with the invention are of such a type that reproduction of a stored signal causes erasure of that signal from the store. Thus, store A is empty at the end of the second field period and field 3 transmission of which commences at that time may be stored therein.

Also, since the outputs from store B are derived at normal rate and storage is performed at half this rate, field 3 may be stored in duplicate in store B at the same time since the store will be erased in advance of the input signals.

Thus, the sequence of operation continues with the odd-numbered field output signals being derived from store A and the even-numbered fields being derived by interpolation from store B, these fields being derived in the correct sequence and at the correct rate for transmission to a conventional television system of receivers.

Figures 3, 4:
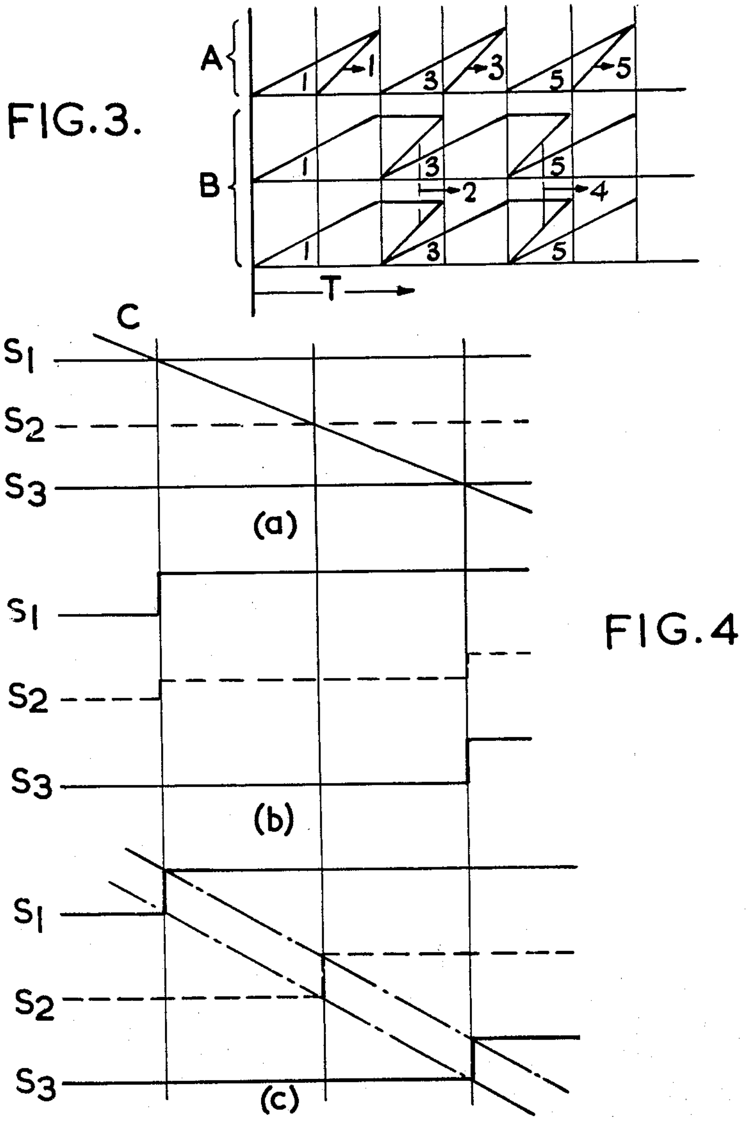
FIGURE 4 is explanatory of forms of interpolation suitable for use with the present invention.

The above sequence of operation is perhaps best understood with reference to FIGURE 3 in which the time axis T is divided into normal field period units. Storage input signals are represented by the first inclined side of each area denoting a field, the end ordinates of each such line on the T-axis representing the commencement and termination of the corresponding input signal to the store in question.

Similarly, the second such line of each area represents derivation of a corresponding field output signal from that store.

Interpolated field output signals are denoted by a broken line between the two store output signal inclined lines from which they are derived.

It will be seen that there is an overall delay of one field period between the originally transmitted signals and the modified signals in the above embodiment.

The above operation will be referred to hereinafter as field interpolation.

One method of interpolation comprises deriving the mean of the signal amplitudes applied to the interpolator. This is a linear form of interpolation and although simple, has a disadvantage in that it does not approximate very well in an area involving a sharp contour, that is, the dividing line between two areas of very different brightness, in the extreme black and white, for example.

One example of such a contour is illustrated for field interpolation by FIGURE 4(*a*) where the contour C separates two areas of very different brightness. The lines $S_1$ and $S_3$ represent the first and second lines of a field signal and the broken line $S_2$ represents the first line of the interlaced field signal to be formed by interpolation. Lines $S_1$, $S_2$ and $S_3$, will then be the first three lines of the complete frame.

FIGURE 4(*b*) represents the signal waveforms of lines $S_1$ and $S_3$ and that of line $S_2$ derived by linear interpolation. It will be seen that the linearly interpolated line is unsatisfactory in this case because it produces a double-stepped blurred outline. FIGURE 4(*c*) represents what is actually desired and is achieved according to a feature of the invention by contour interpolation.

Contour interpolation will now be described with respect to field interpolation and this may be conveniently done by considering the interpolator input signals as being derived by scanning across picture elements representing two lines between which interpolation is to be carried out.

Figure 5:
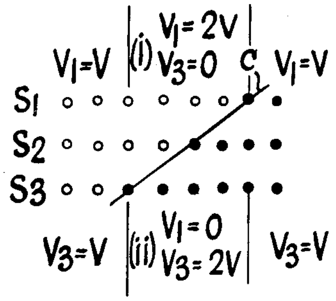
FIGURE 5 is explanatory of a preferred form of interpolation as employed by the present invention.

In FIGURE 5 these two lines of picture elements are denoted by $S_1$ and $S_3$ of which the first six elements and two elements, respectively, represent white and the remaining elements represent black. The line C signifies the contour dividing the white and black areas. The first four elements of the line $S_2$ to be interpolated are then required to be white and the remainder black.

Contour interpolation is carried out in the form $$S_2=\frac{S_1V_1+S_3V_3}{V_1+V_3}$$

where $S_1$, $S_2$ and $S_3$ are the signal levels in the respective lines and $V_1$ and $V_3$ are the velocities of scanning of lines $S_1$ and $S_3$ respectively the velocity of scanning in the interpolated line $S_2$ will be denoted by V. In the normal course of events this amounts to linear interpolation since $V_1=V=V_3$ and $S_2=\frac{1}{2}(S_1+S_3)$. However, when the contour C is intercepted at the third picture element of line $S_3$ the scanning of line $S_3$ is stopped whilst that of line $S_1$ continues at velocity 2V until the contour is intercepted on line $S_1$. During this first phase denoted in FIGURE 5 by (i) the interpolated line $S_2$ continues to be produced at the same rate V but is the same as $S_1$ since $$S_2=\frac{S_1\cdot 2V+0}{2V+0}=S_1$$

This will correctly produce the third and fourth elements of $S_2$ as black. Thereafter, the velocities are reversed until $S_3$ reaches the same point as $S_1$ which is now stopped. During this second phase signified in FIGURE 5 as (ii), $S_2$ is correctly generated as $S_3$, namely black, since $$S_2=\frac{0+S_3\cdot 2V}{0+2V}=S_3$$

When corresponding picture elements are again reached, at the end of phase (ii) the velocities $V_1$ and $V_3$ are again equal to V.

Interception of a contour is signified by the brightness difference between a pair of successive picture elements, initially in this case the second and third elements of line $S_3$, exceeding a predetermined level. This predetermined level is itself determined by the intensity of contour of which it is desired to take account, so that a high predetermined level might only take account of contours between white and black, for example.

Clearly, in the case of a horizontal, or near-horizontal contour such a method of interpolation would fail. Hence, it is proposed that when a contour is first met on one line the scanning on the other line at double velocity only proceeds for a predetermined distance, at the limit of which the interpolation continues as if the contour had been intercepted on the second line also. This predetermined distance is itself determined by the minimum slope of contour of which it is desired to take account.

In practice the method of changing the interpolator input velocities will depend on the type of stores employed in the apparatus and for this reason a suitable kind of store will be discussed first.

One such suitable kind of store is that of a so-called writing-reading tube or in its analogous form a cathode ray tube facing a pick-up tube with a suitable optical system disposed therebetween as employed in conventional television standards conversion apparatus.

Such stores are suitable in that input and output rates to and from a single store can be conveniently varied by electronic means, namely, use of different time-base circuits.

Also, in the case of interpolated outputs it is desirable that the two signals concerned be stored and reproduced under as near identical conditions as possible. This is practicable in tube stores by employing two writing beams to store the two fields or frames concerned in interlaced fashion. Independent reproduction of two signals simultaneously from a tube store although suitable for the invention and theoretically feasible is not, as far as is known, practicable at the present time.

It is proposed that this difficulty be avoided by applying a high frequency oscillation to the Y-axis deflection plates of the reading beam to obtain successive samples from the two lines between which interpolation is being carried out, be it field or frame interpolation. Alternate pulses of the resultant output signal may be readily switched between the two paths to the interpolator.

Regarding the change of scanning velocity for contour interpolation this may also be readily achieved as explained with reference to FIGURES 6 to 8.

Figure 6:
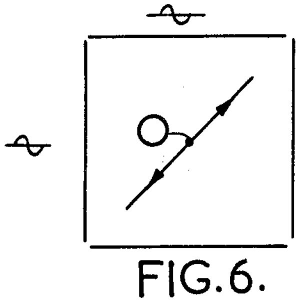
FIGURES 6 and 7 are explanatory of the operation of said form of interpolation in connection with a particular form of storage means.

FIGURE 6 illustrates the resultant trace of an electron beam when the signals applied to the X-axis and Y-axis deflection plates are in the form of two sinusoidal variations of equal frequency and of constant amplitude. This trace is a simple harmonic oscillation about a fixed origin and along a fixed line. The position of the origin will be determined by the datum levels of the applied sine waves, the slope by the ratio of their constant peak amplitude, and the sign of the slope (positive or negative) by their phase relationship, namely, in-phase or 180° out-of-phase.

Figures 7, 8:
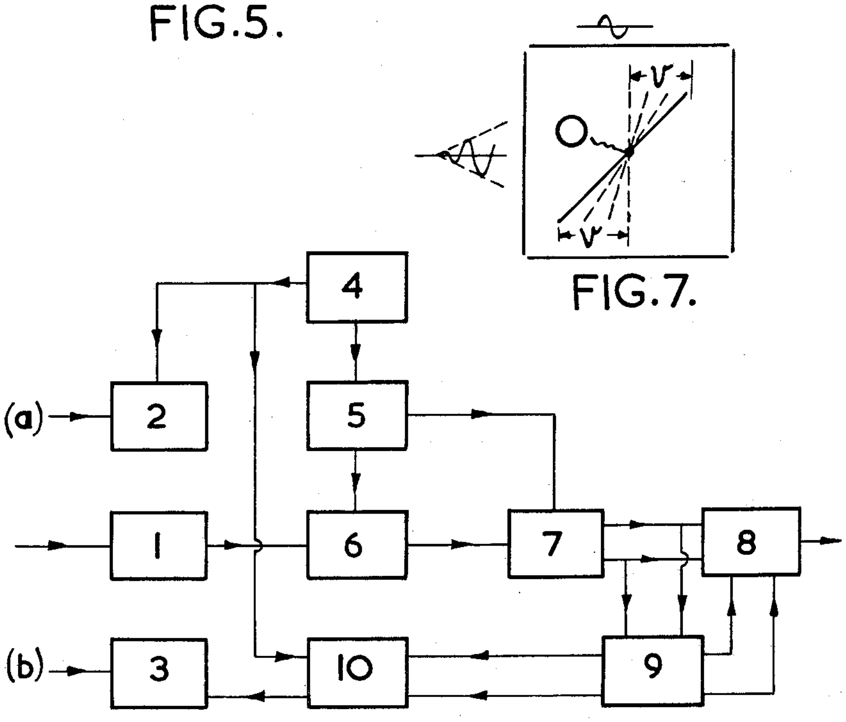
FIGURE 8 is a block schematic representation of apparatus for operation in accordance with the invention employing said form of interpolation.

If one sine wave amplitude, that applied to the Y-axis plates, is maintained constant, and the other, that applied to the X-axis plates, is steadily increased from zero to form a ramped sine wave then the resultant electron beam trace is illustrated by FIGURE 7. This trace is in the form of a sinusoidal oscillation along a straight line which swings from a vertical position, about a fixed origin, in one direction or the other with its end points lying on fixed horizontal lines and moving at constant velocity $v$, as shown. The origin is determined as before by the datum levels, the vertical limits, that is the horizontal traces of the end points by the Y-axis sine wave amplitude, the velocity $v$ by the slope of the X-axis signal ramp, and the direction of swing by the phase relationship as before, clockwise for in-phase signals, and anticlockwise for 180° out-of-phase signals, or this direction may be determined by the polarity of the modulating ramp waveform.

Clearly, such signals can be chosen whereby the origin lies on the line to be interpolated $S_2$, the ends of the swinging line travel along the lines for interpolation $S_1$ and $S_3$, and the velocity of the end points $v=V$. Thus when these signals are superimposed on the signals already required for scanning (in fact these already include the Y-axis sine wave for sampling between $S_1$ and $S_3$) then the contour interpolation requirements of phase (i) FIGURE 5 are met since the two velocities V now present are additive on one line ($S_1$ for the case of FIGURES 5 and 7, for example) and subtractive on the other line ($S_3$). For the phase (ii) requirements of FIGURE 5 the ramp is reduced at the same rate as it was previously increased. When this sine wave reaches zero amplitude the velocities $V_1$ and $V_3$ simultaneously change to V.

FIGURE 8 is a block schematic representation of one suitable apparatus arrangement for performing contour interpolation between the lines of two fields stored on a common camera tube 1 in interlaced fashion. The vertical and horizontal scanning controls for the derivation of output signals from tube 1 are represented by blocks 2 and 3 respectively. These controls give rise to conventional television frame and line scanning waveforms in response to frame and line synchronising pulse inputs (*a*) and (*b*) to produce scanning half-way between the successive pairs of stored lines between which interpolation is to take place.

A high frequency oscillation is generated by oscillator 4 to be superimposed on the frame scanning waveform, thereby to produce sampling between the successive line pairs as hereinbefore described. The oscillator 4 also controls a pulse generator 5 the output from which is applied to a sampling circuit 6 and time selector switch 7 whereby the peaks of the oscillatory output from the tube store 1 are selected and alternately switched between the two inputs to signal distributor 8. The weighting components $V_1$ and $V_3$ are determined by contour sensing circuit 9 wherein successive pairs of samples from each line signal output of switch 7 are compared to ascertain whether or not a contour has been met on either line as hereinbefore described.

Contour sensing circuit 9 also controls, together with oscillator 4, the operation of velocity modulator 10 which generates the appropriate ramp-form sinusoidal waveform to be superimposed on the line scanning waveform when a contour has been intercepted. The phase of this ramp waveform is determined by which line signal output intercepts the contour first and the ramp will be decreased when there is next a signal on the other output of the contour sensing circuit 9 or when the predetermined maximum searching distance is traversed without having met a contour on the other line, as hereinbefore described.

Another form of storage which is thought suitable for use with the present invention is magnetic storage. However, difficulty may be encountered in practice with the scanning velocity changes required for contour interpolation.

This difficulty may be reduced by using magnetic storage in combination with delay line stores for the two lines between which interpolation is being carried out and obtaining output signals at a velocity $v$ down a delay line, that is, by progressing towards the input end or output end, when velocity modulation to $2v$ or 0 is required respectively. The length of such a delay line is required to be at least twice that of the maximum searching distance chosen for contour interpolation. Alternatively a group of delay lines with common input signal for each line signal involved in interpolation at one time may be used, these delay lines being progressively shorter. By normally taking the output from the delay line corresponding to the maximum searching distance it will be seen that the velocity modulation required by contour interpolation may be achieved by progressively switching to the outputs of shorter delay lines to increase the velocity and to the outputs of longer delay lines to decrease the velocity.

Clearly, delay line stores may be employed alone without the cooperation of magnetic stores. Since such stores would then be required to store up to a complete field signal for conventional television it is probably preferable to employ acoustic delay lines to reduce the length of the store. However where a pure sequential broadcast system not employing interlaced fields is contemplated, only a one line delay is required.

The above methods of performing the desired velocity modulation, that is, by scanning along a delay line, or by switching from delay line to delay line, may also be employed in connection with tube stores whereby the velocity modulation is performed externally on output signals from the camera tube.

Clearly an analogous operation to the above-described field interpolation may be carried out to perform what will be referred to as frame interpolation whereby instead of interpolating between successive pairs of lines of alternate fields to form the lines of the interlaced fields, interpolation is carried out between the corresponding lines of successive pairs of alternate frames to form the lines of the intermediate frames.

Contour interpolation may be carried out as before the difference being in this case that one is taking account of movement of contours with respect to time between alternate frames instead of movement of contours with respect to space in one frame. However, the actual application of contour interpolation is quite unchanged.

Figure 2:
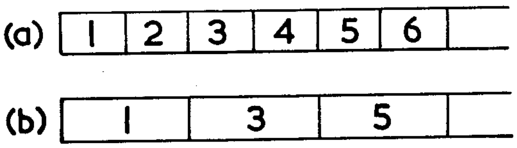
Figure 9:
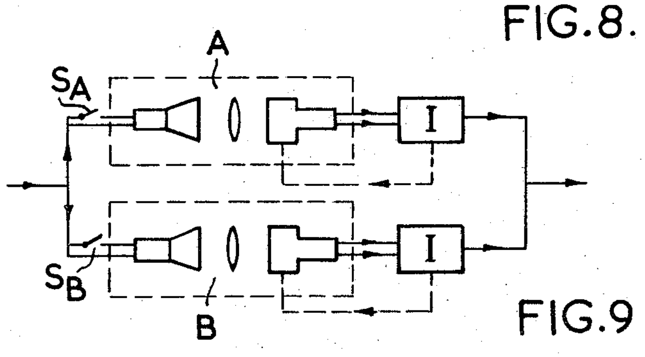
FIGURE 9 illustrates in schematic form a further embodiment of the invention.
Figure 10:
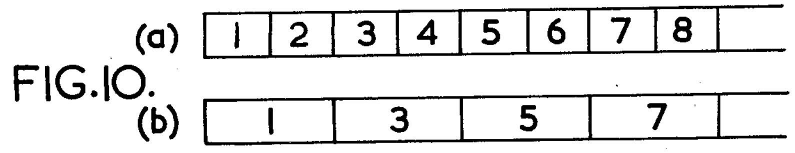
FIGURES 10 and 11 are explanatory of the operation of this further embodiment.
Figure 11:
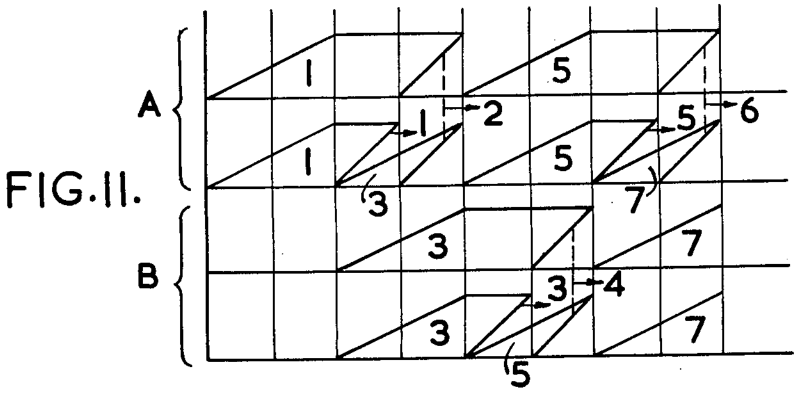

FIGURES 9, 10 and 11 illustrate an embodiment employing frame interpolation and its operation and these figures are considered to be largely self-explanatory when compared with above-described FIGURES 1 to 3. It should be noted, however, that frame numbers are used instead of field numbers in this case for the sake of convenience. Tube stores are indicated for stores A and B and it will be evident from FIGURE 11 that suitable blanking signals will be required for application to the store inputs. The use of such signals is indicated by the presence of switches $S_A$ and $S_B$. Also broken lines are used to denote the feedback required for velocity modulation when contour interpolation is employed.

There will be a delay of two frame periods between the initially transmitted signals and the augmented signals.

Figure 13:
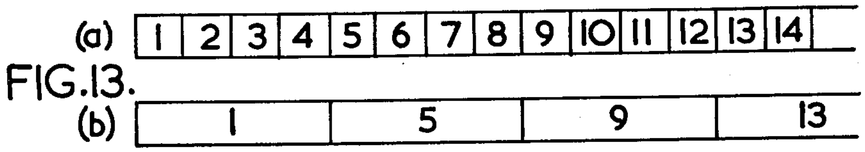
FIGURES 13 and 14 are explanatory of the operation of the embodiment of FIGURE 12 as applied to broadcast television.
Figure 14:
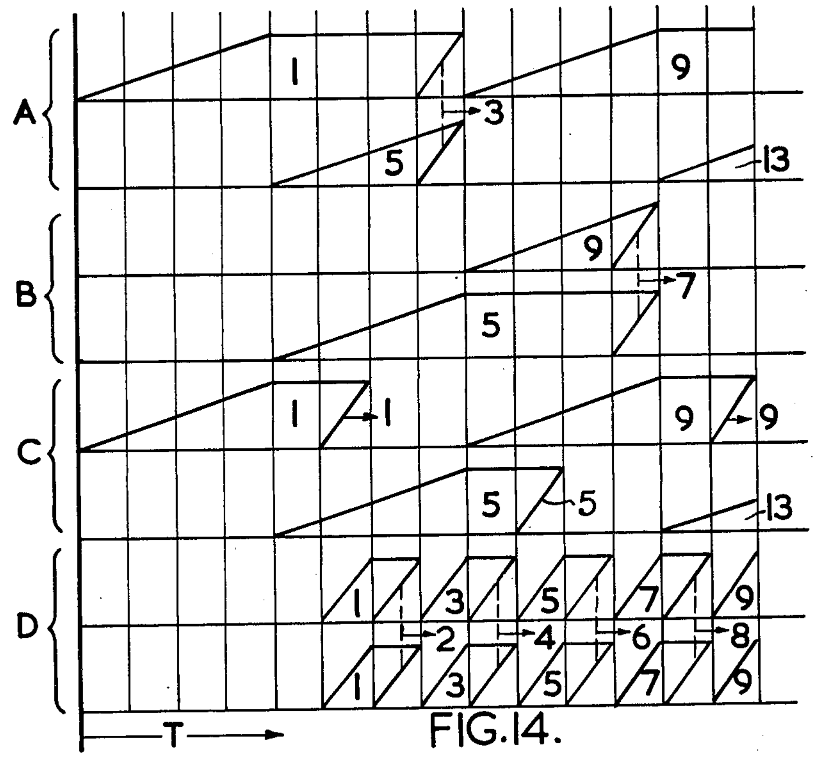
Figure 12:
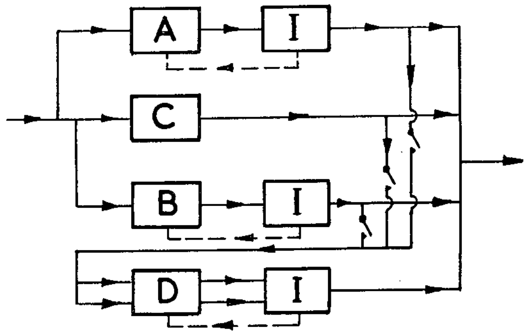
FIGURE 12 illustrates in schematic form a yet further embodiment of the invention.

In some further embodiments of the invention which involve use of both field and frame interpolation that illustrated by FIGURES 12, 13 and 14 makes possible an overall bandwidth reduction of 4:1 at the primary transmitter. Again it is thought that these figures are largely self-explanatory having regard to the above description of field and frame interpolation, except to note that field numbers are employed in this case. Basically the operation comprises field interpolation with field 1 to obtain its interlace field 2, frame interpolation between fields 1 and 4 to obtain field 3, and field interpolation with frame interpolated field 3 to obtain field 4.

It will be seen from FIGURE 14 that there is a delay of five field periods between commencement of the original transmission of a field and reproduction of that field in the apparatus of FIGURE 12. Blanking waveforms are required in this embodiment for application to the store inputs and their form will be evident from FIGURE 14.

Figure 15:
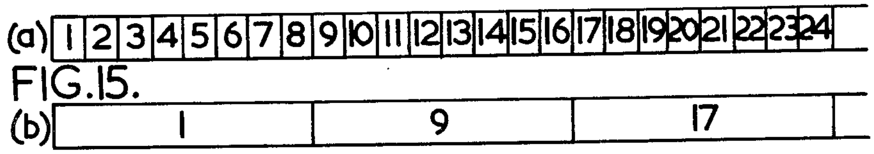
FIGURES 15 and 16 are explanatory of the operation of a still further embodiment of the invention.
Figure 16:
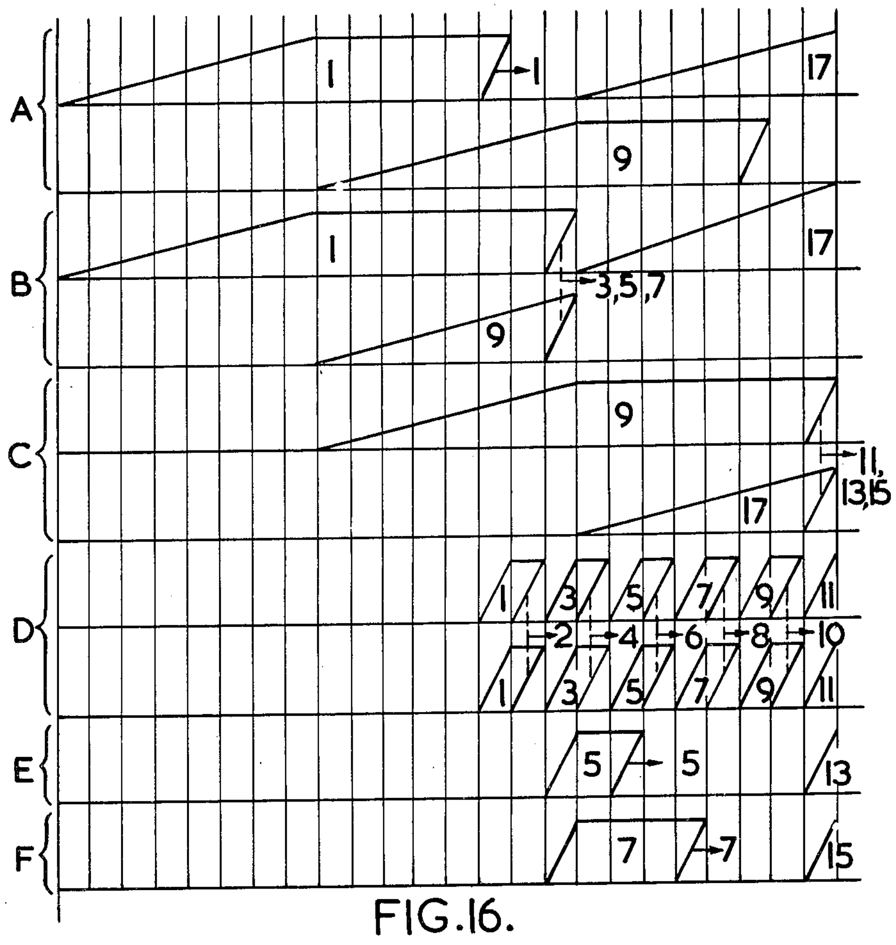

By virtue of a yet further embodiment of the invention an overall television bandwidth reduction of 8:1 may be obtained compared to the conventional transmission bendwidth. FIGURES 15 and 16 illustrate the operation of such an embodiment in similar manner to previous embodiments and will not be described in great detail. In the operation of this embodiment field 2 is obtained by field interpolation from field 1, fields 3, 5 and 7 are obtained simultaneously by frame interpolation between fields 1 and 9, and fields 4, 6 and 8 are obtained by field interpolation from frame interpolated fields 3, 5 and 7, respectively. It will be seen from FIGURE 16 that frame interpolation of fields 3, 5 and 7 is carried out during the field period in which it is required to apply field 3 to the output of the apparatus—thus field 3 is arranged to be constantly produced at the conventional velocity V, previously referred to in relation to contour interpolation whilst fields 5 and 7 are stored temporarily. In order to obtain field 3 at velocity V during velocity variation for contour interpolation it will be seen that the scanning velocities for field 1 and field 9 will be 4V/3 and 0 during phase (i) and, 0 and 4V during phase (ii). Fields 5 and 7 will then be produced at velocities $2V/3$ and $V/3$, and 2V and 3V during such periods, respectively, as indicated and the storage velocities of these fields must be correspondingly reduced and increased so that reproduction thereafter may be conveniently carried out at a constant velocity. This presents no difficulty in practice since the storage time-bases for fields 5 and 7 may be modified simultaneously with velocity variation for contour interpolation between fields 1 and 9 and changed back to V again during periods of effective linear interpolation.

Clearly other schematic arrangements of apparatus may be worked out without departing from the scope of the present invention. This is particularly so, for example, in the last embodiment where in fact many arrangements of stores could be employed to achieve the resultant 8:1 reduction in bandwidth requirements. However, it should be remembered that the arrangements of the above embodiments are in a large part dictated by a need to generate, whenever convenient, interpolated fields and frames during the periods when they are required for utilization and at the correct velocity for such utilization. It has also been attempted, within the above requirements, to reduce the number of stores required in each embodiment to a minimum, although it is not suggested that this has necessarily been achieved. In any case only use of existing stores has been considered whereas future developments in storage tubes may further reduce the requirements of the above embodiments. It is not intended that the application of the invention be restricted to existing stores, since clearly any suitable store, later developed, may be employed without departing from the essence of the invention.

We claim:

1. Picture transmission system comprising means for transmitting sequential signals representing the lines of a selected field of an interlaced two-field scan, means for receiving said signals, means for performing an interpolation between successive lines of said field to provide signals representing an approximation to the lines of the unselected field, said last-mentioned means comprising storage means for storing successively at least two lines of picture signal, means for scanning at a predetermined speed two of the stored lines simultaneously, means for detecting an abrupt change of signal level read out from either one of said lines, means responsive thereto for halting the scan of that line and accelerating the scan of the other line, means for detecting an abrupt change of signal level read out from said other line, means responsive thereto for halting the scan of said other line and resuming at accelerated rate the scan of the said one line up to the point where said scans coincide and thereupon restoring both scanning speeds to said predetermined speed, means for generating an interpolated signal related to a scanning speed intermediate the scanning speeds at which the said two lines are being read and at a signal level intermediate the signals read out from said two lines while both are scanning, said means being responsive to operation of said first named detecting means to equate the interpolated signal to that of the line still scanning whereby an abrupt change equivalent to that experienced in the two stored lines will be generated in the interpolated line signal at a point in its scan intermediate those experienced in the said stored lines, and means for assembling an interlaced version of the received signals and the interpolated signals to provide a picture presentation.

2. Picture transmission system comprising means for transmitting sequential signals representing the lines of a selected field of an interlaced two-field scan, means for receiving said signals, means for storing said signals, means for reading out from said storage means pairs of signals representing pairs of successive lines of the stored field, means for preparing from said read-out signals an interpolated version representing an approximation to a line of the unselected field, said last-mentioned means comprising storage means for storing successively at least two lines of picture signal, means for scanning at a predetermined speed two of the stored lines simultaneously, means for detecting an abrupt change of signal level read out from either one of said lines, means responsive thereto for halting the scan of that line and accelerating the scan of the other line, means for detecting an abrupt change of signal level read out from said other line, means responsive thereto for halting the scan of said other line and resuming at accelerated rate the scan of the said one line up to the point where said scans coincide and thereupon restoring both scanning speeds to said predetermined speed, means for generating an interpolated signal related to a scanning speed intermediate the scanning speeds at which the said two lines are being read and at a signal level intermediate the signals read out from said two lines while both are scanning, said means being responsive to operation of said first named detecting means to equate the interpolated signal to that of the line still scanning whereby an abrupt change equivalent to that experienced in the two stored lines will be generated in the interpolated line signal at a point in its scan intermediate those experienced in the said stored lines, and means for assembling the lines of the interpolated version in interlaced relation with the lines of the selected field to provide a complete picture representation.

3. Picture transmission system comprising means for transmitting sequential signals representing the alternate frames of a dynamic picture representation, means for storing at least two sets of successive frame signals, means for interpolating between the two sets of stored frame signals to provide a set of signals representing an approximation to an intermediate frame, said interpolation means comprising storage means for storing successively at least two lines of picture signal, successive lines being derived from each of said two sets of stored frame signals, means for scanning at a predetermined speed two of the stored lines simultaneously, means for detecting an abrupt change of signal level read out from either one of said lines, means responsive thereto for halting the scan of that line and accelerating the scan of the other line, means for detecting an abrupt change of signal level read out from said other line, means responsive thereto for halting the scan of said other line and resuming at accelerated rate the scan of the said one line up to the point where said scans coincide and thereupon restoring both scanning speeds to said predetermined speed, means for generating an interpolated signal related to a scanning speed intermediate the scanning speeds at which the said two lines are being read and at a signal level intermediate the signals read out from said two lines while both are scanning, said means being responsive to operation of said first named detecting means to equate the interpolated signal to that of the line still scanning whereby an abrupt change equivalent to that experienced in the two stored lines will be generated in the interpolated line signal at a point in its scan intermediate those experienced in the said stored lines, and means for assembling a picture representation from said transmitted signals in alteration with said interpolated signals.

4. Picture signal interpolation apparatus for interpolating between two sets of signals representing spaced lines in a picture scan comprising storage means for storing successively at least two lines of picture signal, means for scanning at a predetermined speed two of the stored lines simultaneously, means for detecting an abrupt change of signal level read out from either one of said lines, means responsive thereto for halting the scan of that line and accelerating the scan of the other line, means for detecting an abrupt change of signal level read out from said other line, means responsive thereto for halting the scan of said other line and resuming at accelerated rate the scan of the said one line up to the point where said scans coincide and thereupon restoring both scanning speeds to said predetermined speed, and means for generating an interpolated signal related to a scanning speed intermediate the scanning speeds at which the said two lines are being read and at a signal level intermediate the signals read out from said two lines while both are scanning, said means being responsive to operation of said first named detecting means to equate the interpolated signal to that of the line still scanning whereby an abrupt change equivalent to that experienced in the two stored lines will be generated in the interpolated line signal at a point in its scan intermediate those experienced in the said stored lines.

5. Picture signal interpolation apparatus as claimed in claim 4 including means for limiting the distance for which either scan proceeds at accelerated velocity independently of the operation of the related detecting means.

6. Picture signal interpolation apparatus for interpolating beetween two sets of signals representing spaced lines in a picture scan comprising storage means in the form of a cathode ray storage tube having a reading beam, means for scanning said beam in the line direction at a predetermined speed, means for oscillating said beam transversely to said line direction between two line levels so as to read each of said two lines in turn, means for detecting an abrupt change of signal level read out from either one of said lines, means responsive thereto for halting the scan of that line and accelerating the scan of the other line, means for detecting an abrupt change of signal level read out from said other line, means responsive thereto for halting the scan of said other line and resuming at accelerated rate the scan of the said one line up to the point where said scans coincide and thereupon restoring both scanning speeds to said predetermined speed, means for generating an interpolated signal related to a scanning speed intermediate the scanning speeds at which the said two lines are being read and at a signal level intermediate the signals read out from said two lines while both are scanning, said means being responsive to operation of said first named detecting means to equate the interpolated signal to that of the line still scanning whereby an abrupt change equivalent to that experienced in the two stored lines will be generated in the interpolated line signal at a point in its scan intermediate those experienced in the said stored lines.

7. Apparatus as claimed in claim 6 wherein the means for oscillating the beam comprises means for generating two high frequency voltage oscillations, means for applying said oscillations as deflecting voltages each to one of two coordinate directions of displacement of said reading beam, means for varying the amplitude of that oscillation operative in the line direction coordinate, and means for varying the relative phases of said two oscillations.

8. Picture transmission system as claimed in claim 2 wherein said transmission is conducted at one half the speed appropriate to a transmission including all the picture fields whereby each field transmission occupies the transmission time appropirate to a complete frame, and wherein said means for storing said signals includes first storage means operative to record the received signals at the speed of said transmission and having reading means operative at double that speed to provide a delayed version of said signals at full speed and second storage means operative to record duplicate versions of said received signals at the speed of transmission, and means for reading both said recorded versions at double the speed of transmission the reading means of said second storage means being operative in a period subsequent to that of the delayed version from said first storage means and prior to reproduction of the next succeeding field from said first storage means.

References Cited in the file of this patent

UNITED STATES PATENTS

| | | |
|---|---|---|
| 2,202,605 | Schroter | May 28, 1940 |
| 2,321,611 | Moynihan | June 15, 1943 |
| 2,921,124 | Graham | Jan. 12, 1960 |